United States Patent [19]

Caceres

[11] Patent Number: 5,180,178
[45] Date of Patent: Jan. 19, 1993

[54] RECREATIONAL CART

[76] Inventor: Roberto Caceres, 730 W. 6th, Freeport, Tex. 77541

[21] Appl. No.: 458,297

[22] Filed: Dec. 28, 1989

[51] Int. Cl.⁵ .................................. B62B 3/00
[52] U.S. Cl. ........................ 280/47.34; 280/79.11; 224/47.42
[58] Field of Search ............ 280/47.34, 47.35, 47.30, 280/47.371, 87.01, 79.11, 79.2, 79.5, 79.3, 79.6; 180/905, 906; 224/42.42, 42.45 R

[56] References Cited

U.S. PATENT DOCUMENTS

| | | | |
|---|---|---|---|
| D. 178,157 | 6/1956 | Switzer | D41/1 |
| D. 285,949 | 9/1986 | Thomson et al. | D21/134 |
| 1,015,467 | 1/1912 | Ainsworth | 296/180 |
| 1,024,469 | 4/1912 | Ballinger | 280/47.2 |
| 1,164,332 | 12/1915 | Brown | 280/79.11 |
| 1,339,109 | 5/1920 | Irrgang | 280/79.11 |
| 1,542,429 | 6/1925 | Weber | 296/180 |
| 2,467,932 | 4/1949 | Foulke | 280/87.01 |
| 3,139,288 | 6/1964 | Peterson | 280/79.11 |
| 3,346,271 | 10/1967 | Parsons | 280/33.99 |
| 3,612,555 | 10/1971 | Baker | 280/47.17 |
| 3,964,762 | 6/1976 | Adams | 280/79.11 |
| 4,166,638 | 9/1979 | De Prado | 280/79.11 |
| 4,203,609 | 3/1980 | Mitchell et al. | 280/47.11 |
| 4,244,144 | 1/1981 | Goldberg et al. | 46/202 |
| 4,396,208 | 8/1983 | Koch | 280/789 |
| 4,458,906 | 7/1984 | Lamson | 280/47.34 |
| 4,796,909 | 1/1989 | Kirkendall | 280/651 |
| 4,797,727 | 1/1989 | Smith | 47/17 |
| 4,856,810 | 8/1989 | Smith | 280/651 |
| 4,887,836 | 12/1989 | Simjian | 280/47.371 |

Primary Examiner—Andres Kashnikow
Assistant Examiner—Richard Camby
Attorney, Agent, or Firm—Donald J. Verplancken

[57] ABSTRACT

A recreational cart has a unitary body and undercarriage insert molded over non-metallic axle portions. The cart is supported by wheels and may be pulled with a rope tied to the body.

10 Claims, 4 Drawing Sheets

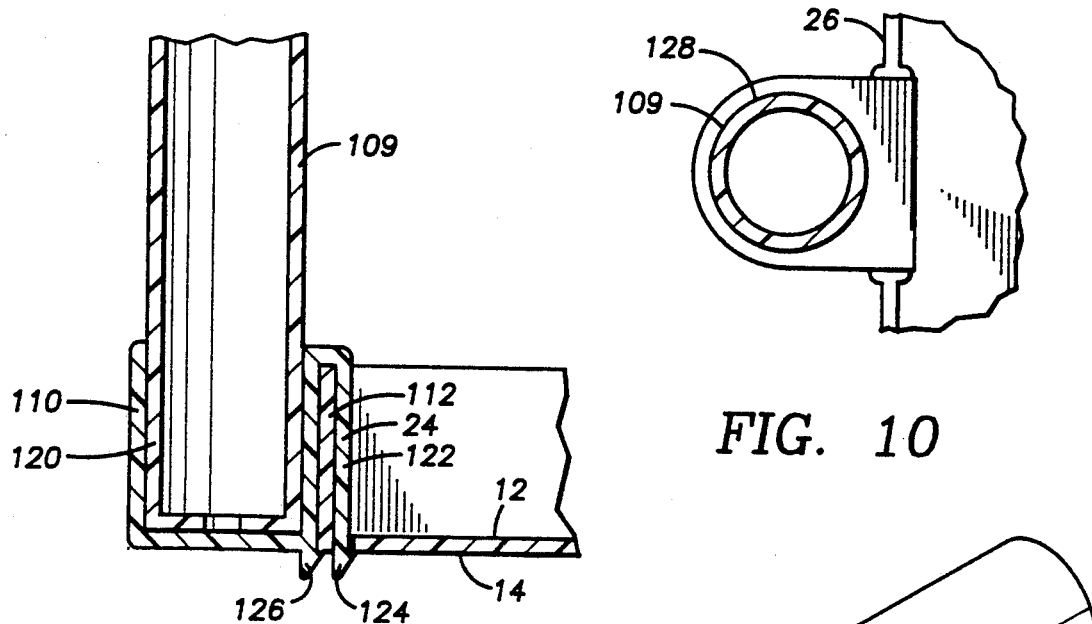
FIG. 9
FIG. 10
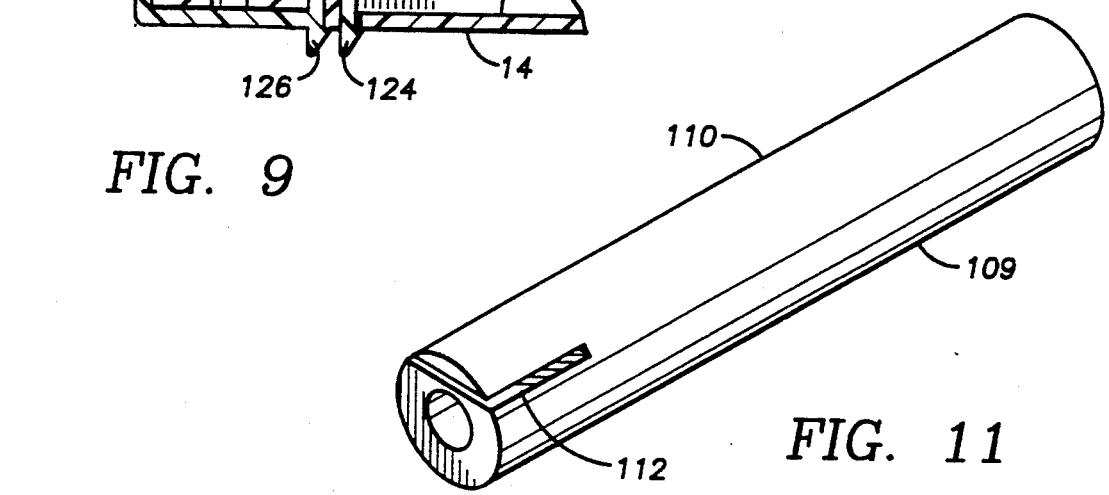
FIG. 11
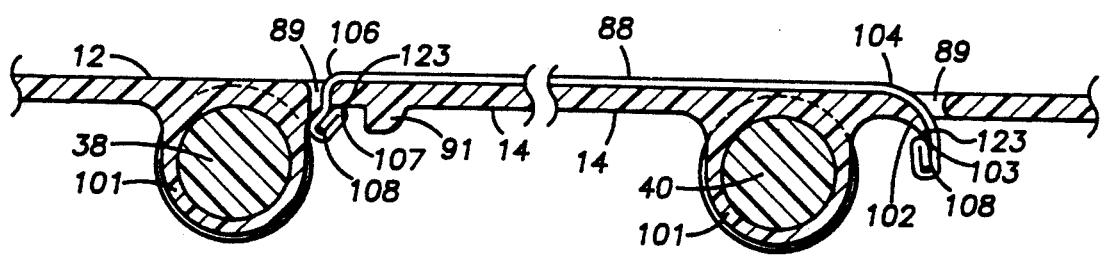
FIG. 12
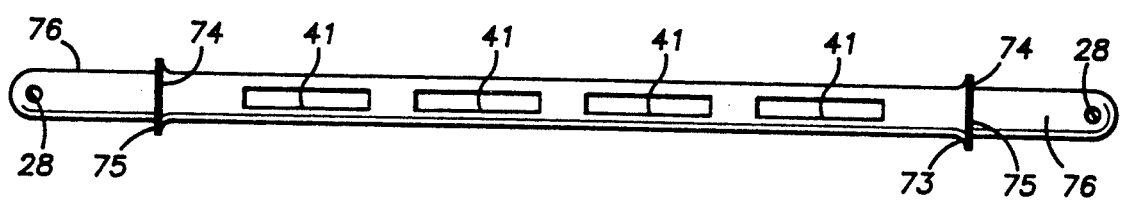
FIG. 13

RECREATIONAL CART

BACKGROUND OF THE INVENTION

This invention relates to the field of non-powered transportation, more particularly to wheeled recreational carts used for hauling loads.

Wheeled carts are used to transport loads which are too bulky, cumbersome, numerous or heavy to be carried by a person. The cart will typically include a body portion or platform on which the load is placed, a substructure or undercarriage for supporting the body portion and for mounting of the wheels, and a guiding portion for guiding and pulling the cart.

A wheeled cart, such as a child's wagon, typically includes a metal platform having a raised perimeter lip extending completely around the platform, a separate metal substructure bolted to the platform which includes axle portions to which wheels are rotatably attached, and an elongated bar attached to the front axle portion to pull and steer the wagon.

One problem with using a metal wagon for hauling loads is that the metal portions tend to corrode or rust. This corrosion may lead to structural failure of the platform or undercarriage, as well as interfere with free rotation of the wheels. These problems are particularly prevalent when the wagon is used near or in water, particularly sea water. Further, the metallic surfaces of the wagon may be scratched or dented, requiring frequent repainting to avoid the initiation of corrosion.

SUMMARY OF THE INVENTION

The present invention is a wheeled recreational cart having a unitary body portion and undercarriage including integral axles therein. The axle portions are independently molded, and the unitary body portion and undercarriage is injection molded thereabout to form a one piece, or unitary, construction. A rope is attached to the front portion of the body of the cart and includes a pistol grip handle for pulling the cart. The handle doubles as a wheel chock to lock the cart in place. The body portion, grip, undercarriage and wheels are all non-metallic, eliminating the problems associated with oxidation in metal wheeled carts.

BRIEF DESCRIPTION OF THE DRAWINGS

The above and other objects and advantages of the present invention will become apparent from the following description, when read in conjunction with the accompanying drawings, wherein:

FIG. 9 is a sectional view of the cart of FIG. 1 at 7—7 further including an alternative rod holder construction;

FIG. 10 is a top view of the alternate rod holder of FIG. 9;

FIG. 11 is a perspective view of an alternate rod holder construction;

FIG. 12 is a partial sectional view of FIG. 1 at section 11—11;

FIG. 13 is a bottom view of one-half an axle portion of the cart of FIG. 1; and, FIG. 14 is a partial top view of the cart of FIG. 1 adjacent the slots for securing the fastener strips to the cart.

BRIEF DESCRIPTION OF THE PREFERRED EMBODIMENT

Figure 1:
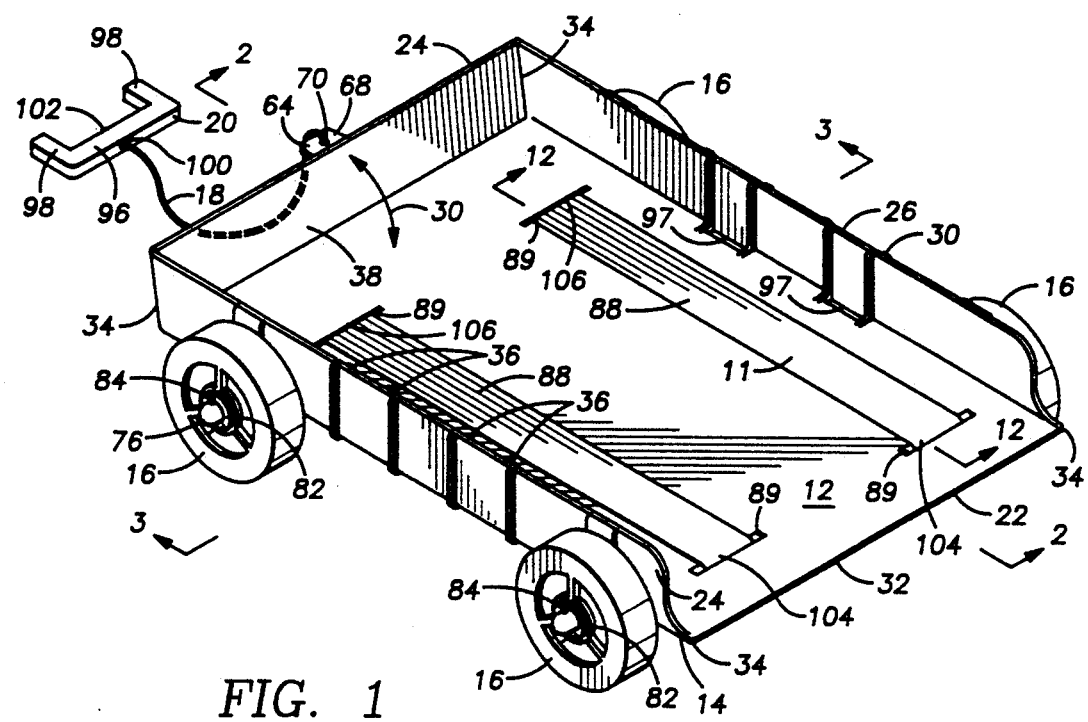
FIG. 1 is a perspective view of the wheeled cart of the present invention.
Figure 2:
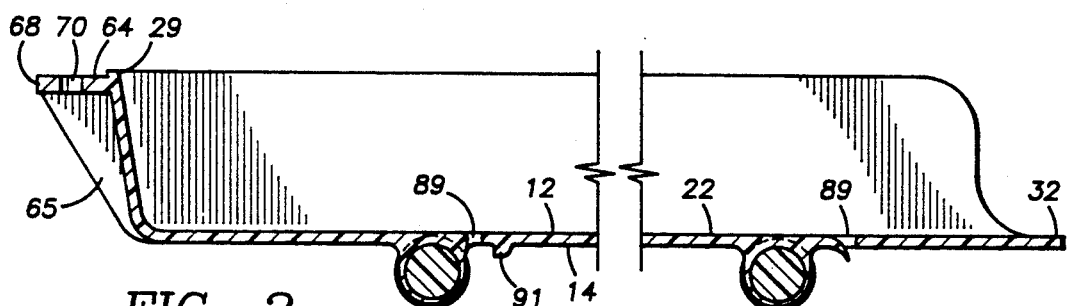
FIG. 2 is a sectional view of the cart of FIG. 1 at section 2—2.

Referring to FIG. 1, the cart 10 of the present invention includes a one piece body portion 12 and undercarriage 14 supported on wheels 16. Rope 18 is attached to body portion 12 and includes a handle 20 at one end thereof to aid in pulling cart 10.

Referring to FIGS. 1 to 4, body portion 12 includes a generally rectangular flat base 22 terminating on three sides in upward projecting wall portions 24, 26 and 28. Opposed wall portions 24, 26 project from base 22 at a generally right angle thereto, and wall portion 28 interconnects wall portions 24 and 26 and is disposed at an obtuse or forward sloping angle 30 to base 22. The orientation of wall portion 28 to base 22 by angle 30 allows wall portion 28 to conform to the profile of the base of a cooler (not shown) when loaded on base 22. The edge of base 22 opposite wall portion 28 terminates in a rounded edge 32. Although base 22 is generally rectangular, each of the four corners 34 of the rectangular perimeter is rounded. Likewise, the intersections of wall portion 28 with each of the side wall portions 24, 26 are rounded. Wall portions 24, 26 may include a series of vertical ribs 36 projecting therefrom and spaced thereon. To permit attachment of rope 18 to cart 10, wall portion 28 includes a tongue 64 extending from the upper edge 29 thereof, which includes a pair of tongue stabilizer ribs 65, supporting a projecting and interconnecting portion 68 from wall portion 28. Projecting portion 68 is generally parallel to flat base 22, and rib 65 is generally perpendicular thereto. A hole 70 extends through projecting portion 68 to receive rope 18.

Figure 5:
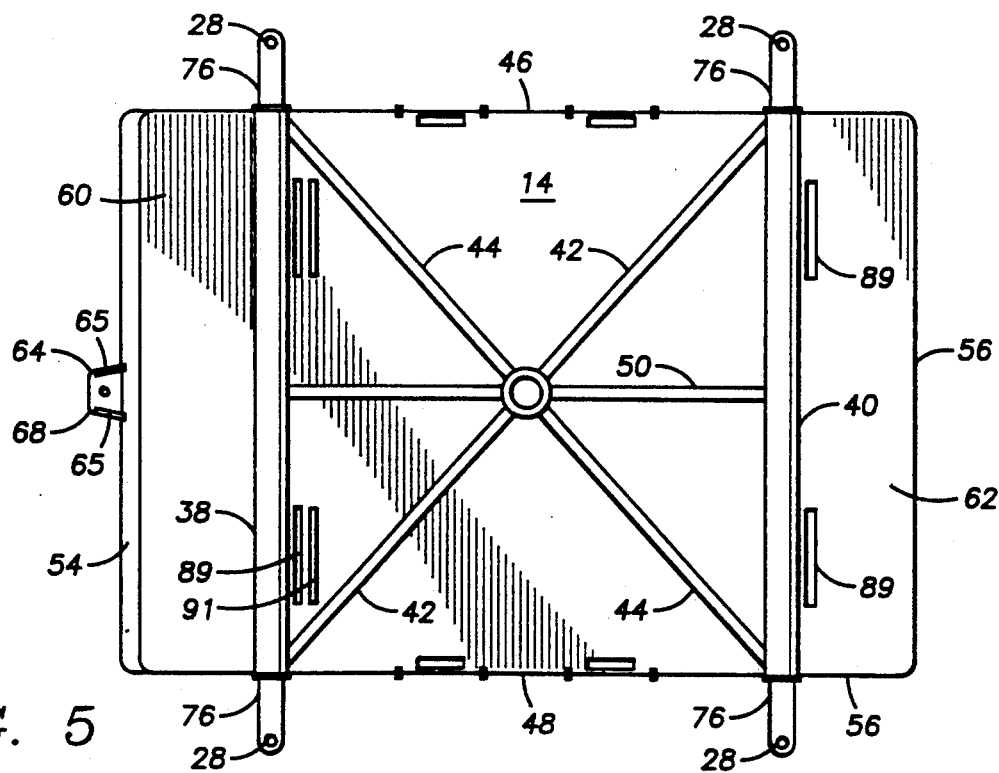
FIG. 5 is a bottom view of the cart of FIG. 1.

Referring now to FIG. 5, undercarriage 14 is formed on the underside of base 22 and includes first and second spaced axle portions 38, 40 integrally molded therein substantially perpendicular to sides 46, 48 of undercarriage 14. Spaced axle portions 38, 40 are preferably molded from a more durable material than the rest of undercarriage 14 and body portion 12. Undercarriage 14 and body portion 12 are then molded over axle portions 38, 40 to form a one piece construction. A pair of diagonal stabilizing ribs 42, 44 project outward from undercarriage 14 and interconnect the sides 46, 48 of undercarriage adjacent separate axle portions 38, 40. Thus, diagonal stabilizing rib 42 traverses undercarriage 14 from the intersection of axle 38 with side 46 to the intersection of axle 40 with side 48. Rib 44 traverses undercarriage 14 from the intersection of axle 40 with side 46 to the intersection of axle 38 with side 48. A third longitudinal rib 50, disposed midway between, and substantially parallel to, sides 46, 48, projects from undercarriage and interconnects axles 38, 40.

Undercarriage 14 has a generally rectangular perimeter 52 conforming to the perimeter of base 22. Sides 46, 48 project along opposite sides of rectangular base beyond axle portions 38, 40 where they terminate in ends 54, 56. The intersection of sides 46, 48 with ends 54, 56 is a radial blend 58 conforming to rounded edge 32. The extension of sides 46, 48 beyond axles 38, 40 forms first and second end portions 60, 62.

Undercarriage 14, including ribs 40, 42, 44 and axle portions 38, 40 and body portion 12 are preferably manufactured by injection molding a single piece of polypropylene material about axle portions 38, 40. One acceptable polypropylene material is tenite® grade P7673-895A, sold by Eastman of Kingsport, Tennessee.

Figure 3:
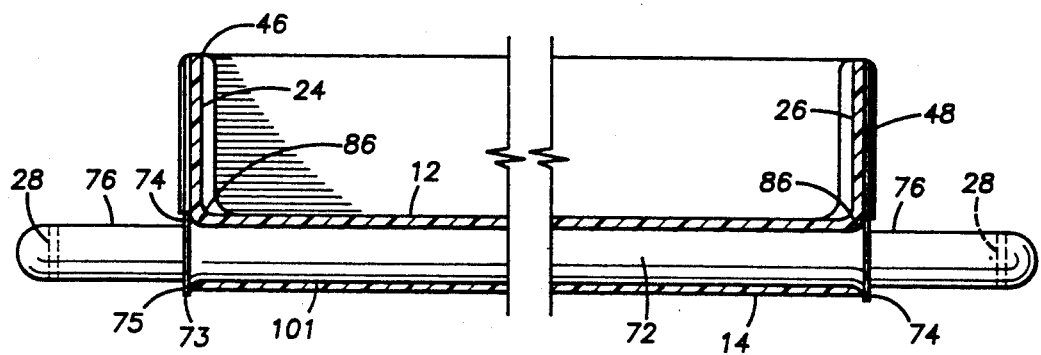
FIG. 3 is a sectional view of the cart of FIG. 1 through the rear axle thereof at section 3—3.

Referring now to FIGS. 3 and 5, axle portions 38, 40 each include a cylindrical portion 72 extending along undercarriage 14 between sides 46, 48 which terminates at its opposed outer ends in mounting washers 74. Mounting washers 74 are a circular circumferential extension of cylindrical portion 72 adjacent the ends thereof which form a circular lip 73 and circular thrust face 75. A axle end portion 76 extends from the center of thrust face 75 outward beyond mounting washer 74 to receive a wheel 16 (shown in FIG. 1). A cotter pin hole 28 is located through axle end portion 76 adjacent its terminus 80 opposite mounting washer 74. To secure wheel 16 on stub axle 76, wheel 16 abuts mounting washer 74 and a washer 82 is placed over the terminus 80 of axle 76 projecting therethrough, and a cotter pin 84 is placed through hole 78. To help reduce cracking at the intersection of axles 38, 40 with mounting washer 74, a circumferential radius 86 is provided to blend them together.

Referring to FIG. 13, to secure axle portions 38, 40 in undercarriage 14 and body 12, each axle portion 38, 40 includes a plurality, preferably four, of apertures 41 extending therethrough. Each aperture 41 is preferably rectangular although other profiles may be employed. Axle portions 38, 40 are preferably manufactured by injection molding glass filled Acetal to the desired configuration. One acceptable Acetal is sold by DuPont Corporation of Wilmington, Delaware and is marketed under the designation Delrin 570. After axle portions 38, 40 are molded and hardened, they are placed in a mold and unitary body 12 and undercarriage 14 are molded thereover. The polypropylene used to mold body 12 and undercarriage 14 passes through apertures 41 thereby securing axle portions 38, 40 therein against movement. A web of material surrounds each axle portion 38, 40 forming an axle retainer membrane 101 which is a continuation of body 12 and undercarriage 14 over each axle portion 38, 40.

Figure 14:
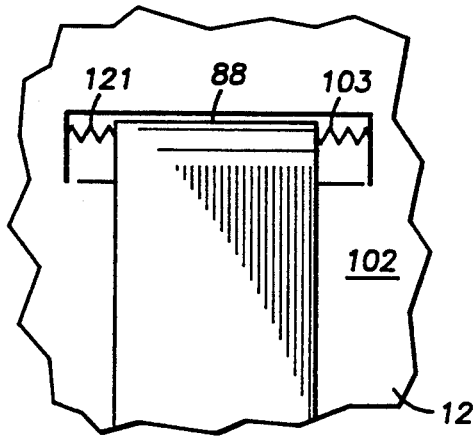

Referring to FIGS. 1 and 11, base 22 includes fastener strips 88, preferably two, disposed longitudinally thereon. Fastener strips 88 preferably have a weaved nap, such as those marketed under the trademark Velcro.® Strips 88 attach to mating strips, now shown, on a cooler or other object with a flat planar base to secure the object to cart 10. To secure fastener strips 88 on cart 10, base 22 includes strip slots 89 therein, disposed parallel to and adjacent axle portions 38, 40. As axle portions 38, 40 are molded within undercarriage 14, the area of undercarriage 14 beneath each axle portion 38, 40 forms an axle retainer membrane 101. Axle retainer membrane 101 is a section of polypropylene, conforming to the cylindrical surface of each axle portion. Axle retainer membrane 101 adjacent a ledge axle 40 includes portion 102 projecting tangentially outward therefrom to form a locking edge 103. The surface of locking edge 103 is formed in a saw tooth, or serrated pattern 121, which helps engage the fastener strips in slots 99. (Best shown in FIG. 14). Membrane 101 adjacent axle 38 is a smooth curve through slots 89, and undercarriage 14 includes a latch portion 107 which is a rounded edge at the interface of undercarriage 14 with slot 89. Each fastener strip 88 is a longitudinal rectangular section extending between apertures 41 adjacent opposed axle portions 38, 40 having opposed end portions 104, 106. Each end portion includes a double folded portion of the strip 88 material, which is sewn in place to form a projecting portion 108. Projecting portion engages edge 103 adjacent axle 40 and latch 107 adjacent axle 38 to lock fastener strip 88 in place on cart 10. Saw tooth pattern 121 may be disposed in each slot 89 to grip the double folded portion 123 of fastener strip 88. A rib 91 is located on undercarriage 14 adjacent slots 89 adjacent axle 38 to reduce the possibility of cracking from repeated flexing in that area.

Figure 4:
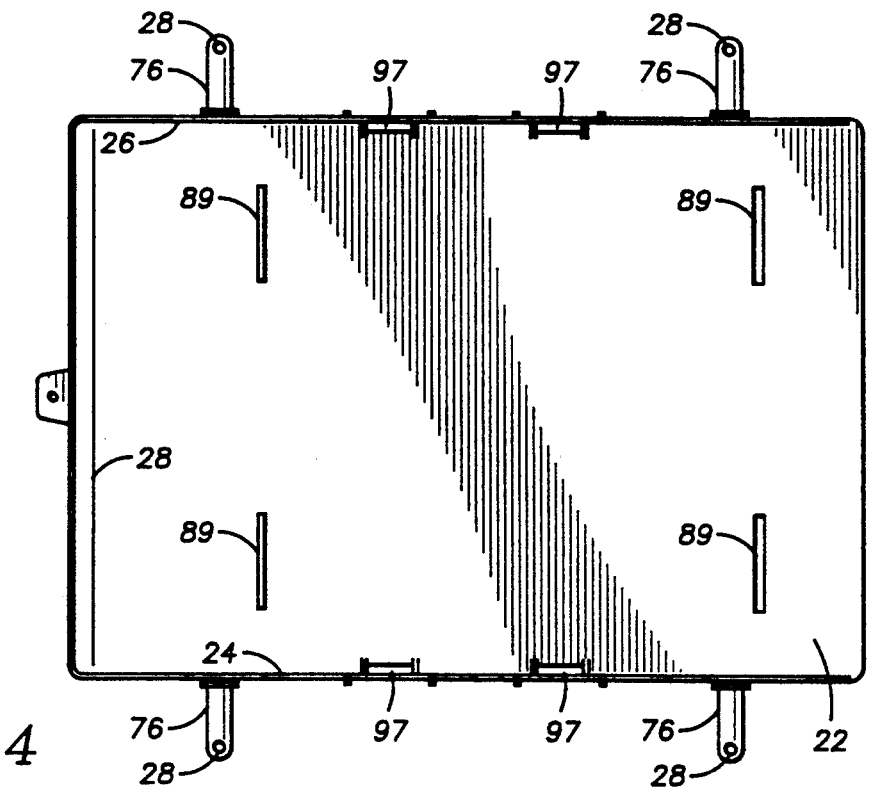
FIG. 4 is a top view of the cart of FIG. 1.
Figure 7:
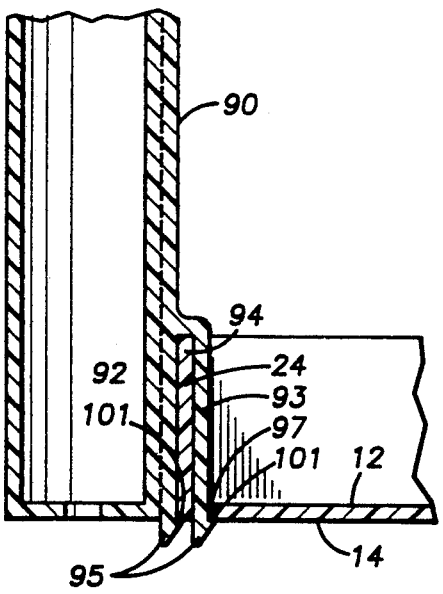
FIG. 7 is a cross-sectional view of the cart of FIG. 1 at section 7—7 further including a rod holder mounted thereon.
Figure 8:
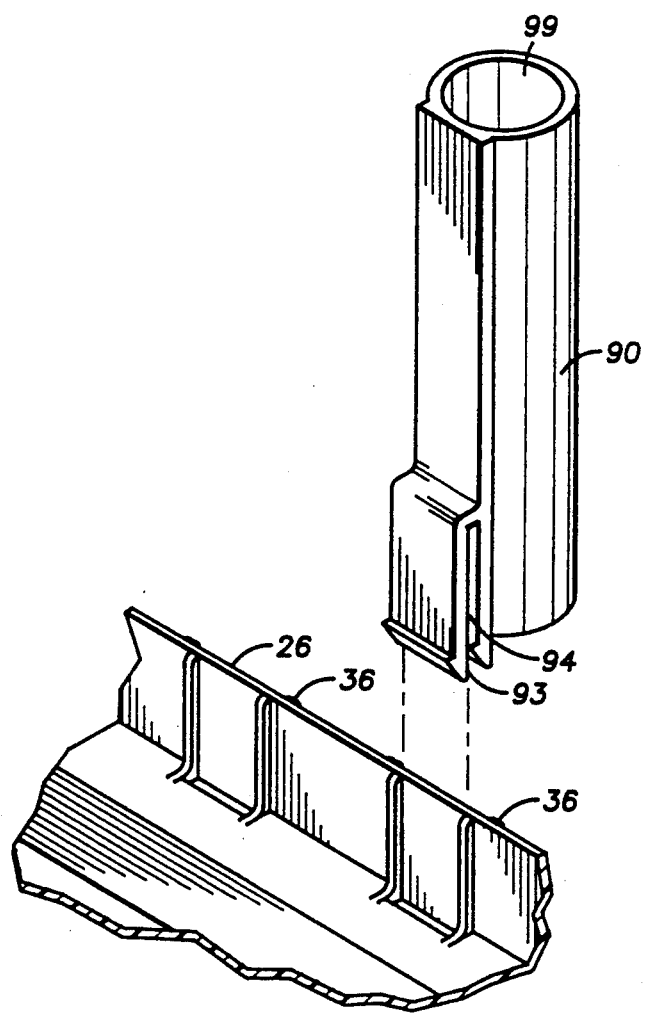
FIG. 8 is a partial exploded perspective view of the cart of FIG. 1 including a rod holder thereon.

Referring to FIGS. 4, 7 and 8, rod holder 90 generally circular cross-section 92 having a flat portion 95 disposed therein. A circular aperture 97 extends through circular portion 92 and slot 94 projects therein adjacent flat portion 95 to receive wall 24 or 26. Slot 94 is bounded by circular portion 92, and slot 94 is slightly wider than the thickness of wall portions 24, 26, and may be easily placed over wall portions 24, 26 with circular portion 92 disposed outward the cart 10 to mount rod holder 90 thereon. A fishing rod, an umbrella, or other device (not shown) may be received within the end of rod holder 90 projecting above wall portion 24 or 26. To stabilize rod holder 90 on wall portion 24 or 26, the end of offset planar section 93 and that of tubular section 92 adjacent offset planar section 92, each include a hook portion 95. Hook portion 90 is a small perpendicular extension having a generally flat upper engagement face 101. Base 12 includes a series of apertures 97 therethrough adjacent wall portions 24, 26, through which hook portion 95 on planar section 93 passes, to anchor rod holder 90 in place by engaging a portion of each hook against the underside of cart 10. As slot 94 is wider than wall 24 (or 26), and apertures 97 are directly adjacent wall 24 (or 26), planar section 93 may be squeezed against tubular section 92 to pass hook 95 through aperture 97, and when released, planar section 93 regains its shape engaging engagement face 10 against undercarriage 14. Semi-elliptical section 92 may extend substantially upward from cart 10, or terminate adjacent the upper edge of wall portion 24, 20.

Referring to FIGS. 9, 10, and alternative rod holder 109 is shown, having a tubular body 110 and slot 112 extending from one end thereof. Slot 112 in holder 90 is sized to fit over wall 24 or 26 such that ribs 36 on either side thereof will stabilize holder 90 is a vertical position. Body 110 includes a tubular aperture 120 offset from a hook wall 122 by slot 112. Hook wall 122 terminates in hook 124, and the portion of body 110 adjacent thereto includes an aperture hook portion 126. Hook 124 engages 97, and hook portion 126 engages over the bottom of wall 24 or 26 and undercarriage 14 to secure holder 109 thereon. Tubular aperture 120 is sized to receive and support a length of pipe 128, such as PVC, therein. A fishing rod, umbrella or the like may be placed in holder 109.

Referring again to FIG. 1 and 8 handle 20 is attached to cart 10 through a rope 18 connected to mounting hole 70 is tongue 64. Handle 20 is a general U-shaped section and includes a finger conforming section 96 connecting opposed upright sections 98. Upright sections 98 are spaced on conforming section 96 to receive a portion of wheel 16 therein (best shown in FIG. 8). An attachment hole 100 is disposed through conforming section 96 substantially midway between upright sections 94, and receives rope 18 therethrough. Rope 18 includes a knot 102 therein to prevent rope 18 from being pulled through handle 20.

Figure 6:
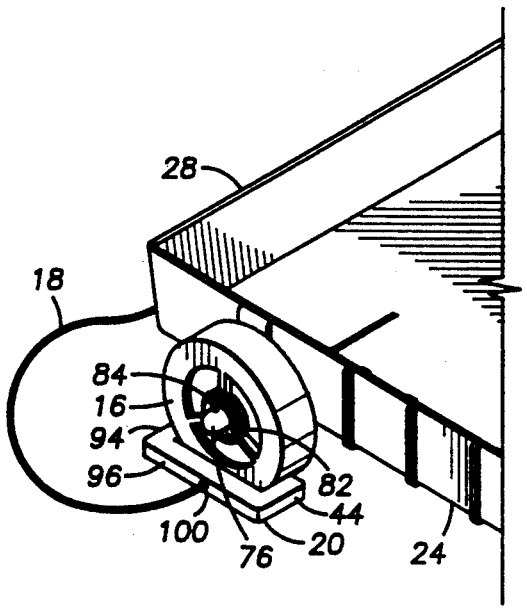
FIG. 6 is a perspective view of the handle locking the wheel.

Referring to FIG. 6, the use of the handle 20 as a wheel check is shown. Handle 20 is sized such that when it is placed on the ground, upright sections 48 will locate on either side of wheel 16, thus limiting cart movement.

By manufacturing the entire cart, except cotter pin, including wheels 18, body portion 12, undercarriage 14 and handle 20, from non-metallic materials the effect of corrosion is minimized. Preferably, the body portion 12 and undercarriage 14 should be unitary molded of reinforced plastic over pre-molded axle portions 38, 40.

I claim:

1. A cart, comprising;
a one piece body portion and undercarriage;
at least one stationary axle portion disposed within said one piece body portion and undercarriage and having at least one axle end portion projecting outward from said body portion; said axle portion including at least one slot therethrough, and a portion of said body and undercarriage are received therein;
a wheel attached to each of said axle end portions;
said body portion and undercarriage being molded over said stationary axle portion to secure said stationary axle portion in place within said unitary body and undercarriage portion.

2. The cart of claim 1, wherein said axle portion includes a circumferential mounting washer thereon adjacent said axle end portion.

3. A cart, comprising;
a one piece body portion and undercarriage;
at least one stationary axle portion disposed within said one piece body portion and undercarriage and having axle end portions projecting outward from said body portion;
a wheel attached to each of said axle end portions; and,
said axle portion includes at least one stabilizing aperture therethrough to receive a portion of said unitary body portion and undercarriage.

4. A cart, comprising;
a one piece body portion and undercarriage;
at least one stationary axle portion disposed within said one piece body portion and undercarriage and having axle end portions projecting outward from said body portion;
a wheel attached to each of said axle end portions; and,
a rope is attached to said body portion, said rope having a free end disposed from said cart to receive a handle thereon;
said handle being U-shaped and selectively locatable on one of said wheels to prevent said cart from moving.

5. The cart of claim 1, wherein said body portion forms a flat mounting platform.

6. A cart, comprising;
a unitary body portion and undercarriage;
at least one axle portion surrounded by said unitary body portion and undercarriage and having axle end portions projecting therefrom;
a rope attached to said undercarriage and having a free end;
a handle attached to said free end of said rope;
a wheel attached to each of said axle end portions;
said body portion forming a flat base;
said body portion having a mounting portion formed thereon including an aperture therethrough having a hook portion thereon, and a fastener strip extending on said platform and secured to said hook portion.

7. The cart claim 6, wherein said hook portion includes a serrated edge for receiving said fastener strip.

8. The cart of claim 6, wherein said fastener strip has a weaved nap.

9. The cart of claim 5, wherein said mounting platform includes unturned sides.

10. The cart of claim 1, wherein said axle is formed of a first material, and said undercarriage and body are formed of a second material.

* * * * *